(12) United States Patent
Bereiter

(10) Patent No.: US 7,895,350 B1
(45) Date of Patent: Feb. 22, 2011

(54) N-WAY DATA STREAM SPLITTER

(75) Inventor: Thomas W. Bereiter, Austin, TX (US)

(73) Assignee: Motive, Inc., Austin, TX (US)

( * ) Notice: Subject to any disclaimer, the term of this patent is extended or adjusted under 35 U.S.C. 154(b) by 1184 days.

(21) Appl. No.: 10/107,557

(22) Filed: Mar. 27, 2002

Related U.S. Application Data

(63) Continuation of application No. 09/900,347, filed on Jul. 5, 2001.

(51) Int. Cl.
  *G06F 15/16* (2006.01)
  *G06F 15/173* (2006.01)
(52) U.S. Cl. .................... 709/231; 709/238
(58) Field of Classification Search ......... 709/230–231, 709/238; 717/331–332
  See application file for complete search history.

(56) References Cited

U.S. PATENT DOCUMENTS

| 5,400,331 A | * | 3/1995 | Lucak et al. ................. 370/401 |
| 5,664,093 A | | 9/1997 | Barnett et al. .......... 395/183.07 |
| 5,678,002 A | | 10/1997 | Fawcett et al. ......... 395/183.01 |
| 5,701,399 A | | 12/1997 | Lee et al. ..................... 706/11 |
| 5,742,773 A | | 4/1998 | Bloomfield-Brown et al. ..................... 395/200.58 |

(Continued)

OTHER PUBLICATIONS

Duke P. Browning and Thomas W. Bereiter, *A Method and a System for Providing Tiered Assistance*; filed Mar. 5, 2001; U.S. Appl. No. 09/800,404; 17 pages of Specification (including claims & abstract); and 7 sheets of figures.

*Primary Examiner*—Aaron Strange
(74) *Attorney, Agent, or Firm*—Hitt Gaines, PC

(57) ABSTRACT

The invention relates to separating data from a data stream. More specifically the invention relates to pre-registering tags and destinations for data marked with the particular tag. The invention also relates to sending a data sub-stream to a destination according to the pre-registered tag. The invention inserts a destination for data marked with the tag into a lookup table. The invention also scans a data stream for the tag to determine the destination to receive the data marked with the tag. The invention also teaches using a hash table to immediately determine the destination of a data stream. An embodiment of the invention sends a data stream to a service provider. Another embodiment of the invention sends an XML data sub-stream to a destination determined by information contained in pre-registered tags.

4 Claims, 8 Drawing Sheets

U.S. PATENT DOCUMENTS

| | | |
|---|---|---|
| 5,754,766 A | 5/1998 | Shaw et al. .............. 395/200.3 |
| 5,790,780 A | 8/1998 | Brichta et al. .......... 395/183.22 |
| 5,908,383 A | 6/1999 | Brynjestad ................. 600/300 |
| 5,918,004 A | 6/1999 | Anderson et al. ...... 395/183.14 |
| 5,926,624 A | 7/1999 | Katz et al. ............. 395/200.47 |
| 5,944,839 A | 8/1999 | Isenberg ...................... 714/26 |
| 5,983,364 A | 11/1999 | Bortcosh .................... 714/25 |
| 5,983,369 A | 11/1999 | Bakoglu ..................... 714/46 |
| 5,992,737 A | 11/1999 | Kubota ...................... 235/380 |
| 5,994,032 A | 11/1999 | Goffing et al. ............. 430/307 |
| 5,995,956 A | 11/1999 | Nguyen ....................... 706/54 |
| 6,041,323 A | 3/2000 | Kubota .......................... 707/5 |
| 6,145,096 A | 11/2000 | Bereiter et al. ................ 714/25 |
| 6,167,395 A | 12/2000 | Beck et al. ..................... 707/3 |
| 6,170,011 B1 | 1/2001 | Beck et al. .................. 709/224 |
| 6,170,065 B1 | 1/2001 | Kobata et al. .................. 714/7 |
| 6,177,932 B1 | 1/2001 | Galdes et al. ............... 345/329 |
| 6,195,763 B1 | 2/2001 | Mayer et al. .................. 714/25 |
| 6,219,719 B1 | 4/2001 | Graf .............................. 710/1 |
| 6,230,287 B1 | 5/2001 | Pinard et al. .................. 714/31 |
| 6,237,114 B1 | 5/2001 | Wookey et al. ............... 714/47 |
| 6,493,695 B1* | 12/2002 | Pickering et al. ............. 706/47 |
| 6,507,874 B1* | 1/2003 | Tuniman et al. ............ 709/247 |
| 6,801,619 B1* | 10/2004 | Bae ......................... 379/266.01 |
| 6,925,631 B2* | 8/2005 | Golden ....................... 717/115 |
| 6,959,004 B2* | 10/2005 | Takase et al. ............... 370/428 |

\* cited by examiner

N-WAY DATA STREAM SPLITTER

CROSS REFERENCE TO RELATED APPLICATIONS

The present patent application is a continuation of U.S. patent application Ser. No. 09/900,347, filed on Jul. 5, 2001, entitled "N-Way Data Stream Splitter," naming Thomas W. Bereiter as the inventor; which relates to co-pending U.S. patent application Ser. No. 09/800,404, filed on Mar. 5, 2001, entitled "A Method and a System for Providing Tiered Assistance," naming Duke P. Browning and Thomas William Bereiter as inventors. These applications are being incorporated herein by reference in their entirety.

BACKGROUND OF THE INVENTION

1. Field of the Invention

The present invention relates to splitting of a data stream and directing data sub-streams to pre-registered destinations.

2. Description of the Related Art

As businesses continue to move online, distributed computing environments become more complex and, thus, more difficult to troubleshoot. Indeed, entire businesses now desire to connect their critical business systems directly to employees, customers, vendors and other important constituencies. To this end, many internal or external business network applications are now being connected to the Internet's World Wide Web to make the information accessible from anywhere using conventional browser software.

Technical support services and programs diagnose and solve hardware or software problems encountered by computer users. Traditional technical support centers place their emphasis on internal tracking and productivity tools, such as problem tracking systems. Such "back end" systems exist internally to the support organization and are usually transparent to the customer. Although back-end systems aid internal efficiency, they do little for the actual problem resolution process. Problem resolution is typically left to telephony-based technologies such as agent-based automatic call distribution support centers and intelligent voice response devices.

Such techniques attempt to diagnose and address problems on a remote node without actually having the technician travel to that node. One method for providing service is for the user to request service via the Internet, rather than over the telephone. The Internet provides a simple and convenient medium to exchange information regarding the problem and also allows the user to download possible software solutions to his problem and allows the service provider to monitor the problem from a remote location.

Software service providers may have several support personnel on hand to address requests for service as they arise. However, the service providers may have various levels of experience in certain software fields. In the alternative, certain service providers may have more education with certain technological features. A need exists to provide a method to assign the most suitable service provider to each request for support. Efficiently assigning the most suitable service provider requires splitting data from a data stream. The present invention addresses this need.

SUMMARY OF THE INVENTION

The invention relates to efficiently processing an incoming data stream to identify sub-streams of interest for further processing and routing the sub-streams to corresponding destinations for further processing. Multiple data sub-streams can be split from the incoming data stream and sent to respective destinations in parallel. When a sub-stream is identified for routing, the sub-stream can be routed to its destination independently of further processing of the incoming data stream, such that sub-streams can be routed prior to receiving the entire incoming data stream. This routing upon identifying the sub-stream enables parallel processing of portions of the data stream and decreases overall processing time. The total time for processing the incoming data stream is therefore independent of the number of sub-streams identified and depends upon the time necessary to identify each sub-stream. Thus, the data is sent to the destination substantially simultaneously with receiving the data.

Destinations for sub-streams are registered before a data stream is received. Pre-registering limits the processing that must be performed upon receiving the data steam to only that processing necessary to identify the sub-streams. Routing the sub-streams to destinations for further processing is based upon looking up the sub-stream identifiers in a look-up table rather than upon parsing or analyzing the data. Utilizing a look-up table is more efficient than methods previously known.

More specifically, the invention relates to pre-registering tags and destinations for data marked with the tag. The invention also relates to sending a data stream to a destination according to the pre-registered tag. The invention inserts a tag and a destination for data marked with the tag into a lookup table. A tag identifies a type of sub-stream of interest.

In addition, the invention scans a data stream for the tag to determine the destination to receive the data marked with the tag. The invention also teaches using a hash table to immediately determine the destination of a data stream. An embodiment of the invention sends a data stream to a service provider. Another embodiment of the invention sends a data stream to the most appropriate service provider as determined by information contained in the tags. Finally, another embodiment of the invention sends an XML data stream to a destination determined by information contained in pre-registered tags.

The foregoing is a summary and this contains, by necessity, simplifications, generalizations and omissions of detail; consequently, those skilled in the art will appreciate that the summary is illustrative only and is not intended to be in any way limiting.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION OF THE DRAWINGS

The following is intended to provide a detailed description of an example of the invention and should not be take to be limiting of the invention itself. Rather, any number of variations may fall with the scope of the invention defined in the claims following the description.

After encountering a computer hardware or software problem a user can decide to contact a vendor. The invention is not limited to a specific system or network but the Internet is an example of an applicable system. A user can contact a support vendor through the Internet and request assistance. When a user requests assistance from an on-line service provider, the user's browser is initially connected to the vendor's host server, as described in more detail below. From the host server, information is stored in a data base (also described below) before the request for service is forwarded to a support desk top. At the support desk top the service request is assigned to an engineer or other service provider.

Figure 1:
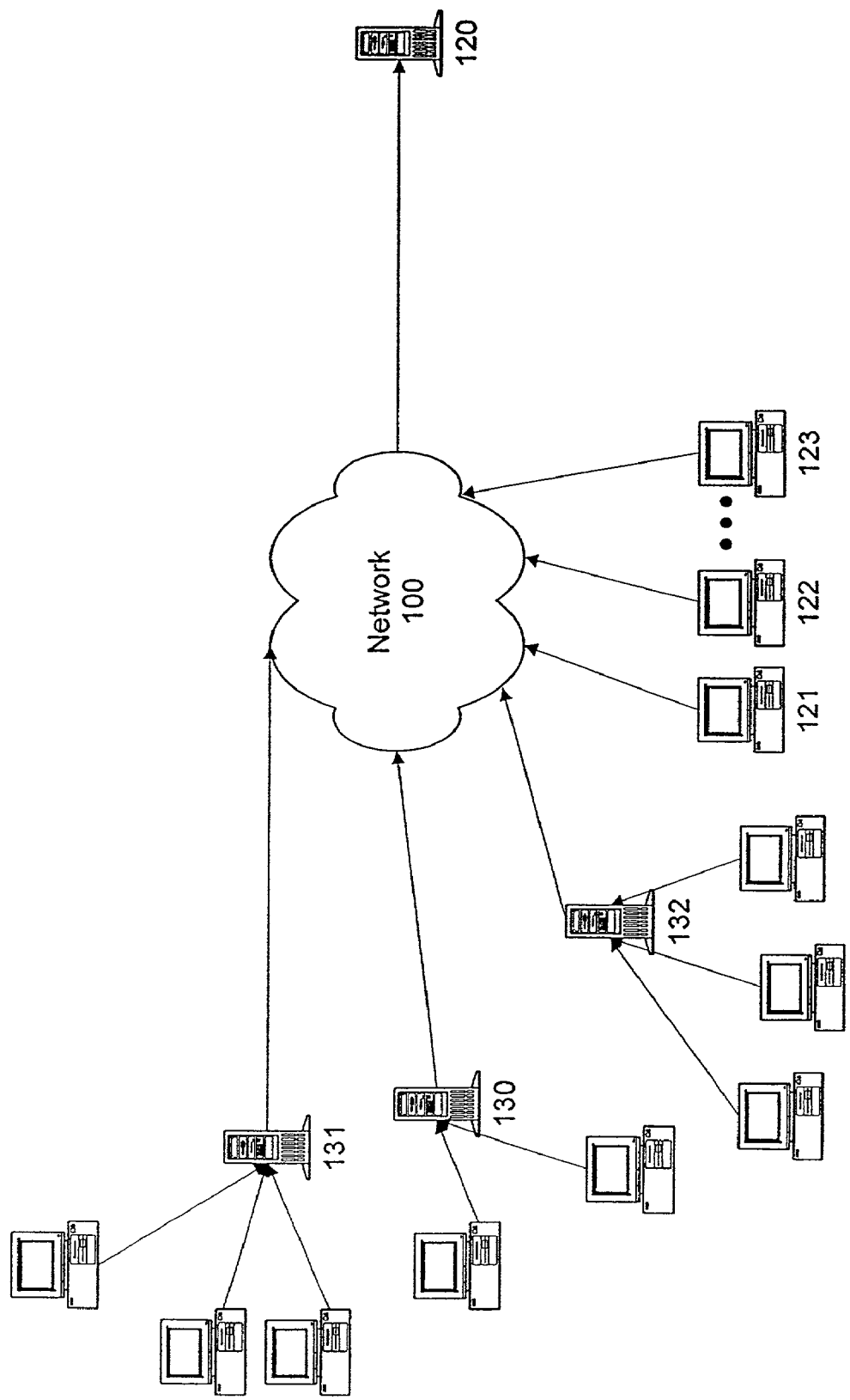
FIG. 1 is a block diagram illustrating a network environment in which embodiments of the present invention may be practiced.

FIG. 1 illustrates a network environment in which the present invention may be practiced. As is illustrated in FIG. 1, network 100, (e.g. a private wide area network (WAN) or the Internet) includes a host server 120 accessible by client terminals 121, 122 and 123. Host server 120 is also accessible by client servers 130, 131 and 132. Communication between client terminals 121, 122 and 123 and host server 120 typically occurs over a publicly accessible network, such as a public switched telephone network over ADSL telephone lines or high-bandwidth trunks, for example communications channels providing T1 or OC3 service. Communication between client servers 130, 131 and 132 is through the same, or similar means. Client terminals 121, 122 and 123 and client servers 130, 131 and 132 access host server 120 through a service provider, e.g., an Internet service provider such as America On-Line™, Prodigy™, CompuServe™ and the like, by executing application specific software, commonly referred to as a browser.

Code to implement the present invention may be operably disposed or stored in computer-readable storage media such as one or more of system memory, fixed disk, CD-ROM, or floppy disk. The operating system provided on client computer system or server may be MS-DOS®, MS-WINDOWS®, OS/2®, UNIX®, Linux® or other known operating system. Client computer system 200 also supports a number of Internet access tools, including, for example, an HTTP-compliant web browser having a JavaScript interpreter, such as Netscape Navigator® 3.0, Microsoft Explorer® 3.0 and the like.

Figure 2A:
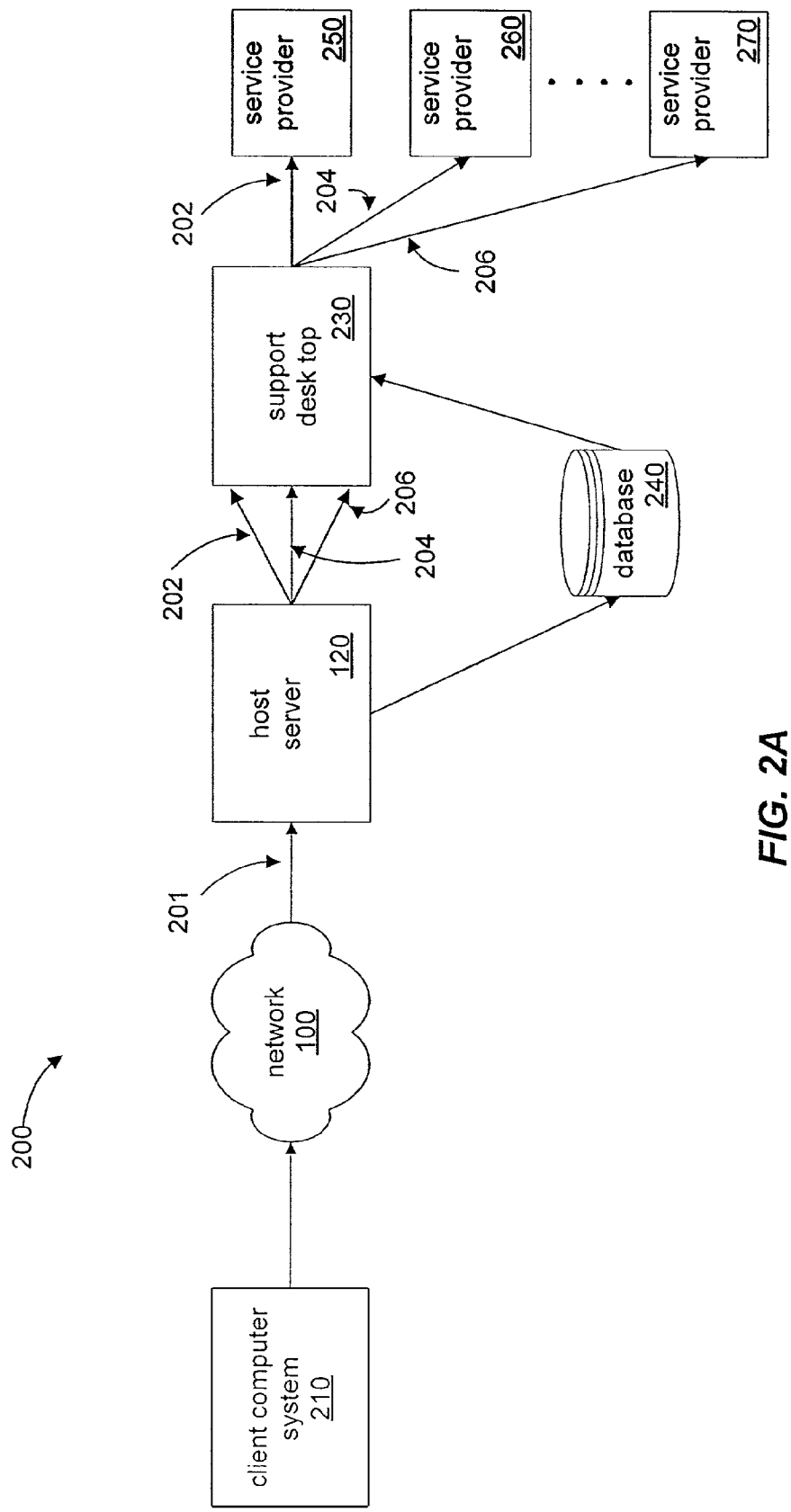
FIG. 2A depicts the interconnection of the client computer system of FIG. 1 to the host server.

FIG. 2A is a block diagram depicting system 200 in which client computer system 210 is coupled to network 100. Client computer system 210 can be similar (or equivalent) to client computer systems 121, 122 and 123 as shown on FIG. 1. Alternatively, client computer system 210 can be similar (or equivalent) to client servers 130, 131 and 132 as shown on FIG. 1. A modem, network interface or other method can be used to provide connectivity from client computer system 210 to network 100.

Client computer system 210 is able to access information on host server 120 using, for example, a web browser (not shown). Protocols for exchanging data via the Internet are well known to those skilled in the art. Although FIGS. 1 and 2 depict use of the Internet for exchanging data, the present invention is not limited to the Internet or any particular network-based environment.

Referring to FIG. 2A, a browser running on client computer system 210 employs a TCP/IP connection to pass a request for service to host server 120. For example, host server 120 can run an HTTP "service" (e.g., under the WINDOWS® operating system) or a "daemon" (e.g., under the UNIX® operating system). Host server receives data stream 201 from client computer system 210. (Data stream 201 can include a plurality of requests for service transmitted from client computer systems 121, 122, 123 and client servers 130, 131 and 132 as shown in FIG. 1A.) Optionally, host server 120 stores data received from client computer system 210 in database 240. Database 240 is accessible to support desk top 230, although database 240 is not essential to the invention.

In an embodiment shown in FIG. 2A, host server 120 can split data stream 201 into data sub-streams 202, 204 and 206. (Although only three sub-streams are shown host server 120 can split data stream into one or more sub-streams only limited by the operating frequency, memory and other technical limitations of server 120.) Host server 120 forwards the requests for service to support desktop 230. Support desktop 230 is coupled to service providers 250, 260 and 270. Support desk top 230 analyzes a request for service and forwards the request for service to service provider 250, 260 or 270 (or other appropriate destination as further illustrated in FIG. 2B). As shown in FIG. 2A, an application operating on support desk top 230 can determine that service provider 250, 260 and 270 are the most appropriate service providers to receive data sub-streams 202, 204 and 206 respectively. In this case, support desk top 230 sends data sub-stream 202 to service provider 250, data sub-stream 204 to service provider 260 and data sub-stream 206 to service provider 270. Thus, each service provider can receive a data sub-stream from support desk top 230.

The service provider receives additional information, if necessary, and endeavors to solve the problem by communicating with client computer system 210 via the Internet. Note that while three service providers 250, 260 and 270 are shown, the invention supports one or more service providers. Still referring to FIG. 2A, support desk top 230 can analyze the request to determine which of the service providers 250, 260 and 270 is available.

In one embodiment, support desk top 230 analyzes a request to determine which of the service providers 250, 260 and 270 is the most suitable to provide the service requested. The most suitable service provider is based on a list of predetermined criteria including experience, technical expertise and availability of the service provider. As discussed further below (refer to FIG. 2B), host server 120 can send portions of the data to other destinations. For example, host server can send portions of the requests for processing by other software modules. The software modules can be resident on host server 120 or alternatively can be resident in a separate computer such as support desk top 230.

Figure 2B:
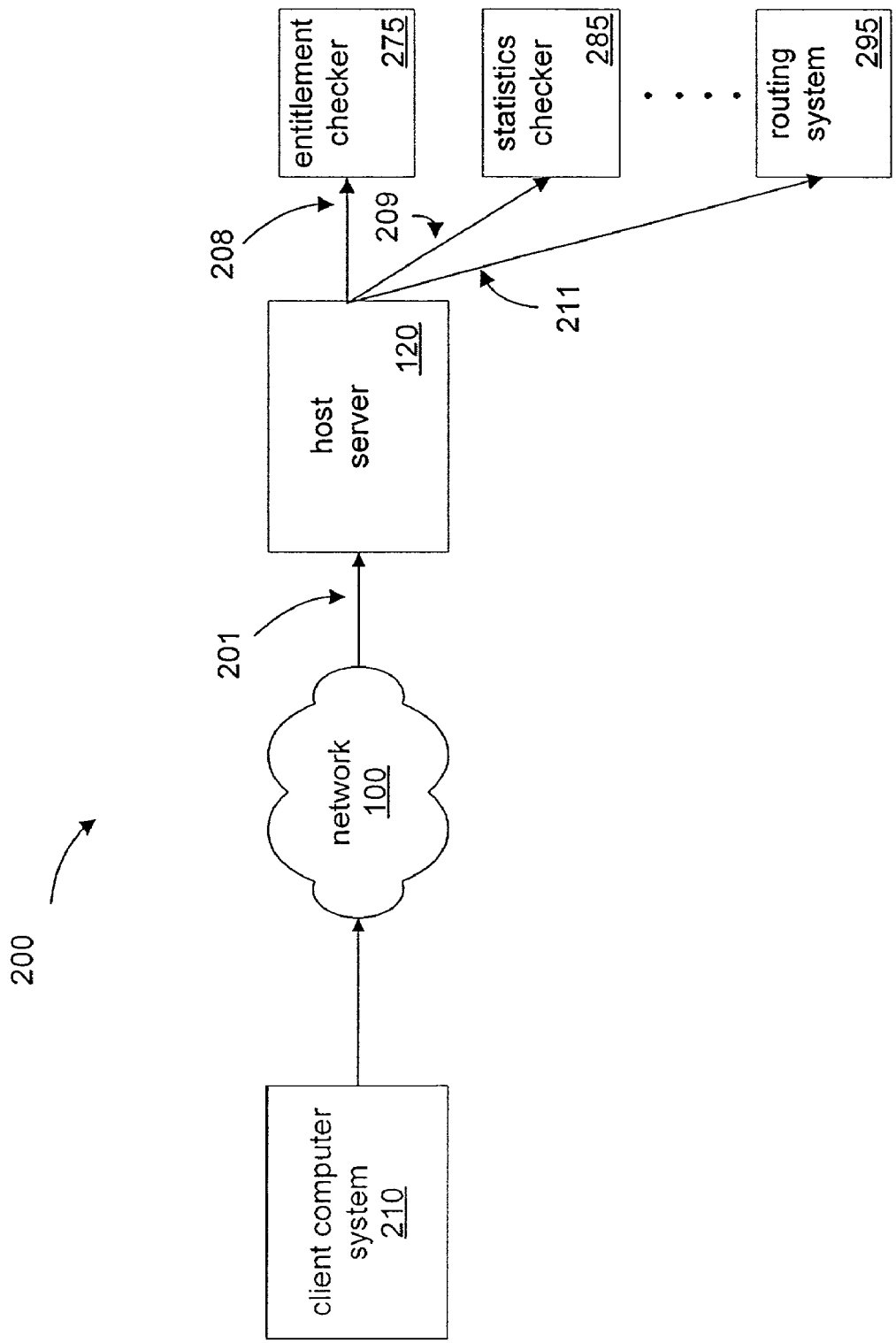
FIG. 2B depicts an embodiment of the interconnection of the client computer system of FIG. 1 to the host server.

In an embodiment shown in FIG. 2B, host server 120 can forward data sub-streams to software modules. As shown in FIG. 2B, host server 120 can send data sub-stream 208 to entitlement checker 275, a data sub-stream such as data sub-stream 209 to statistics checker 285 and can send data sub-stream 211 to routing system 295. (Although only three software modules are shown, the invention supports one or more software modules or other destinations.)

Entitlement checker 275 can be used to check an entitlement of a user requesting service. Entitlements can be distinguished by levels, such as gold and silver. In this example, a user entitled to services at the silver level may be entitled to submit four requests a day and a gold user may be entitled to submit an unlimited number of requests per day. In this embodiment data analysis allows determination if the user is a gold user or a silver user and also allows determination of the silver user has exceeded his permitted number of requests. If the silver user has exceeded four requests on a given day then the pending request is not processed. Thus, entitlement checking allows verification that a requestor is entitled to the services requested before the services are provided and prevents unnecessary demands for system resources before those resources are provided.

An embodiment of the invention relates to analysis of the data sub-steams. Referring to FIG. 2B, a data sub-stream such as data sub-stream 209 can be sent to statistics checker 285 by host server 120. An analysis may show common'factors between requests for service. In an embodiment, identifying common factors may identify failure trends by providing information to manufacturers for design improvements. In another embodiment, data sub-streams can be stored, for example in database 240 (shown in FIG. 2A), and data analysis performed at a future date.

In an embodiment, data analysis can support a routing function. Referring to FIG. 2B, host server 120 can send a data sub-stream such as data sub-stream 211 to routing system 295. A routing function can determine in which queue to place a request for service based on a single, or a plurality, of factors. The factors can be related to either the user or the service provider. In an embodiment, the data is routed to a routing system which identifies a service provider based on various characteristics of both the service provider and the user. In this example, a routing system can consider and technical expertise of an available service provider and the entitlement level of the user.

Figure 3:
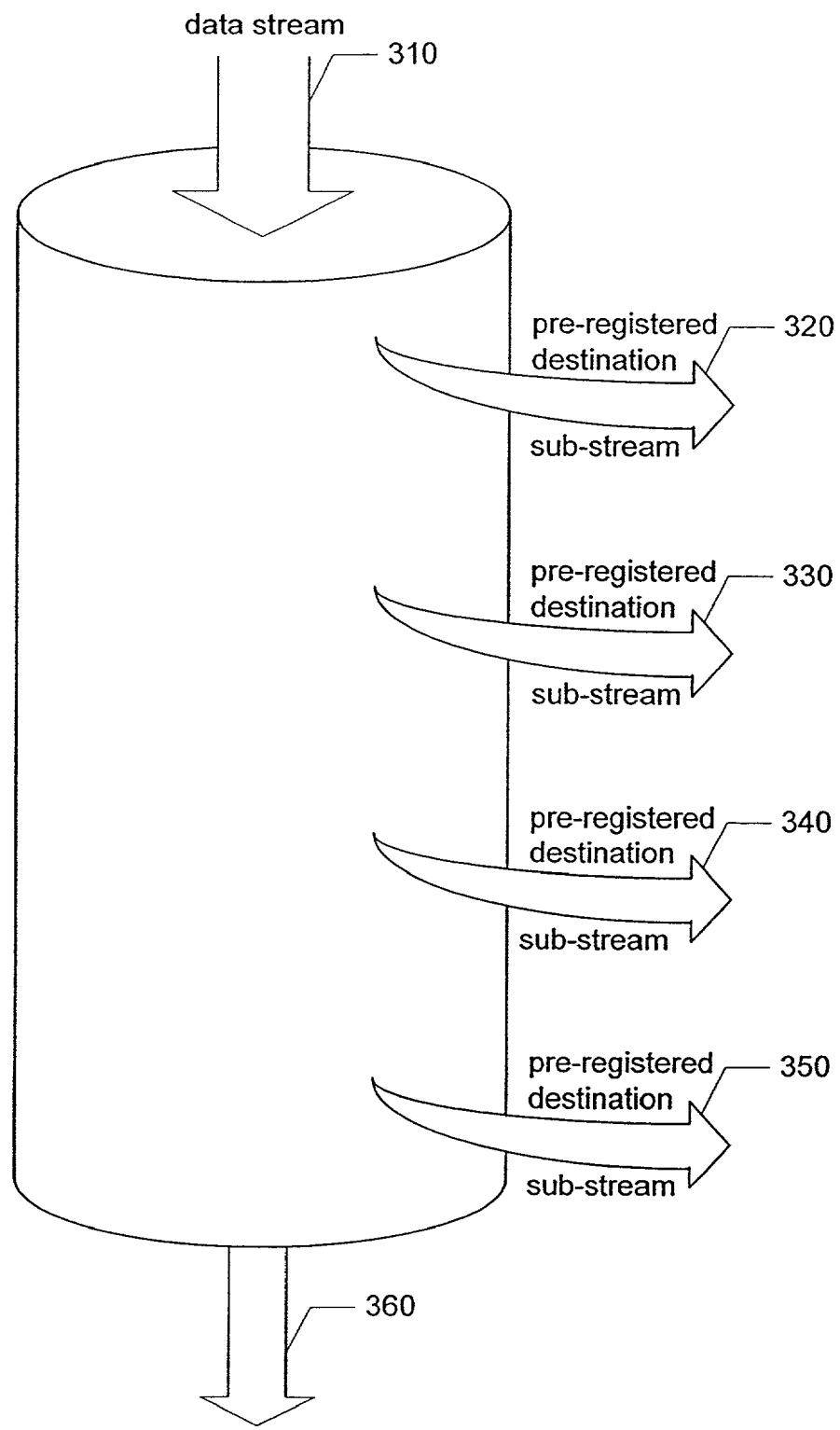
FIG. 3 is a representation of data steams being split from an incoming data stream.

FIG. 3 depicts dividing a data stream into sub-streams. Pre-registering sub-streams 320, 330, 340 and 350 identifies the data fields to be split from data stream 310. Pre-registering also identifies the destination of the data sub-streams. As shown, data fields contained in the data stream 360 without pre-registered destinations continue uninterrupted to the original destination of the data stream.

Features of the invention further described below (refer to FIGS. 4-7) allow efficient splitting of the data stream. The data stream is processed during a single pass of the data stream as the data stream is being received, without the need to store the data stream and make another pass of the stored data stream. Thus, efficient splitting of a stream requires less processing time than a method which stores the data and processes the data stream again before sending the data to a destination. For example, the method described herein is expected to require substantially less processing time than required by previously known methods that store data.

As the data stream is received, tags in the data stream are scanned. Only one pass of the data stream is used to identify tags of interest. A look up table of destinations corresponding to particular tags is compiled. As further described below, as tags are identified in the data stream, a location in the look up table is computed to determine whether a destination for the data marked with the tags exist. As described further below, referring to the lookup table is more efficient than other systems because further processing of the data is not required to determine a destination. Thus, the method taught facilitates sending a data sub-stream to a destination substantially simultaneously with receiving the data stream.

In the embodiments of the invention described herein, the incoming data streams are described as being in Extensible Markup Language (XML) format. However, the scope of the invention includes data streams having any format from which data fields and data field values can be determined. XML is a subset of the Structured Graphics Markup Language (SGML). XML provides a uniform method for describing and exchanging structured data in an open text based format. In XML, a data field and its value are identified using tags. A tag identifies data of interest. As explained further in FIGS. 4-7, data having a certain tag can be split into a data sub-stream that is routed to a destination.

The use of a tag can be understood using the following example of XML code:
<name>Joe</name> is interpreted as meaning that the data field "name," identified by start tag <name> and end tag <\name>, has a value of "Joe". While the term "tag" is used to describe collectively both the start tag and the end tag, the tag is commonly referred to using only the start tag. For example, the tag <name><\name> is referred to herein as the <name> tag. Data associated with a tag are the data between the start tag and the end tag; in the foregoing example, the data associated with the <name> tag are "Joe."

An example of a compound tag is shown below:
<name><first name>Joe</first name><last name>Smith</last name></name>

This compound tag indicates that the name is composed of a first name, "Joe", and a last name, "Smith".

In one embodiment of the invention, a method includes using a lookup table and a hash index scheme to automatically determine a destination for selected data while processing a data stream. The method includes pre-registering tags and corresponding destinations to receive the data associated with the registered tags. Each tag and its corresponding destination(s) are stored in a lookup table that is later used to determine the destination(s) for portions of an incoming data stream. In an embodiment, XML delivers the data by use of the standard HTTP protocol although other suitable transport protocols may be used.

Compound tags (e.g. <contact><name>) may be pre-registered. Each tag within a compound tag is considered to be a level of a hierarchy of tags. For example, the compound tag
<one><two><three> has a three-level hierarchy. One embodiment of the invention uses a fixed number of levels in the hierarchy.

The data stream is split according to the pre-registered tags and destinations, explained in the following discussion of FIG. 4.

Figure 4:
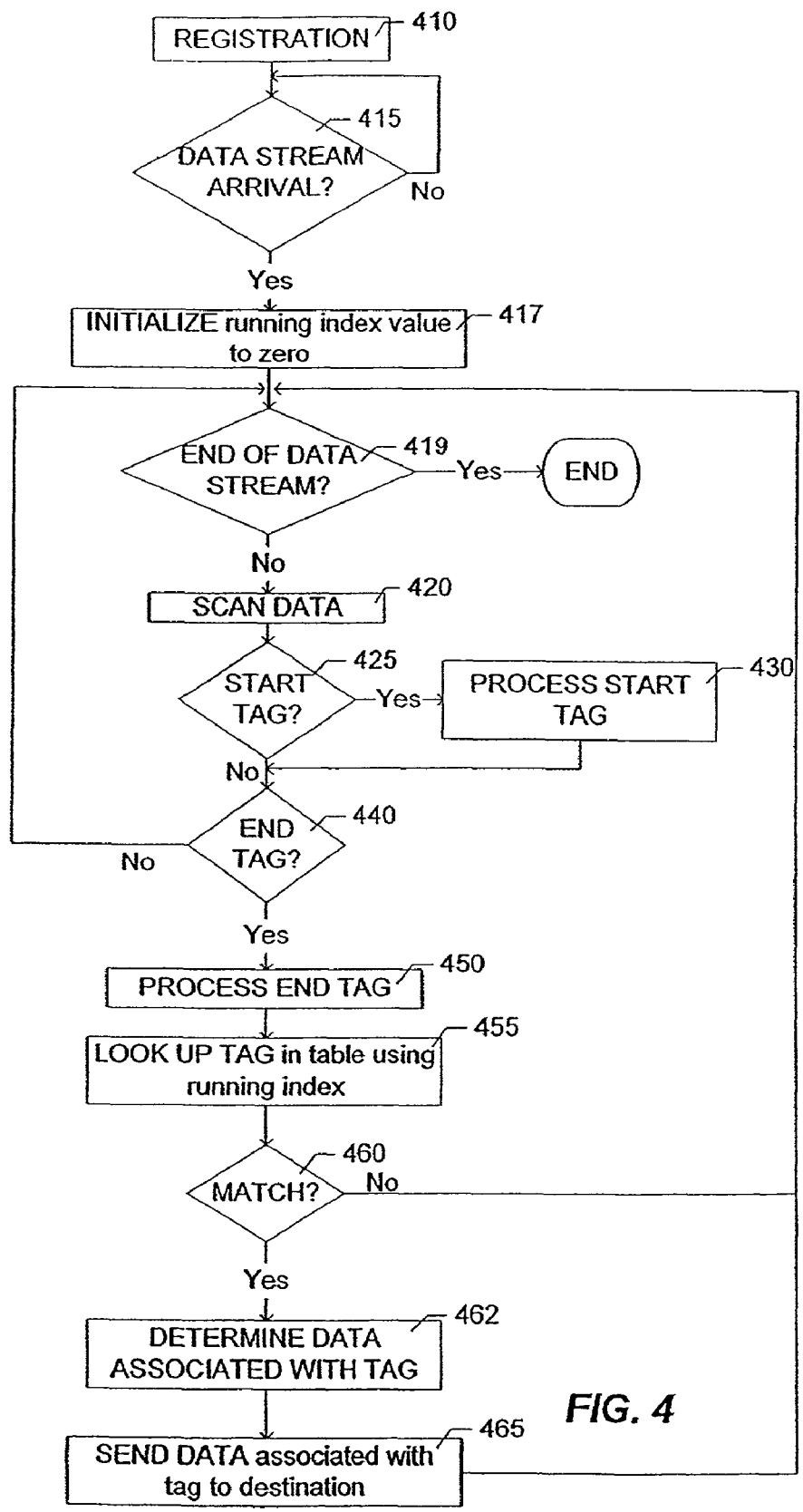
FIG. 4 is a flow diagram depicting the logical steps of registering a destination for data associated with a tag, processing a data stream to identify the tag, determining data associated with the tag, and sending the data associated with the tag to a pre-registered destination.

FIG. 4 shows a flowchart of the operation of an embodiment of the present invention. REGISTRATION step 410 includes building a lookup table for destinations for data associated with tags in a data stream. The lookup table is built prior to processing data streams and includes a record for each combination of a tag and a destination for data associated with the tag.

In this embodiment, a location within the lookup table is calculated by applying a hash function to the value for each tag (or level of the hierarchy). The destination for data associated with the tag is stored in the calculated location in the lookup table. A hash function assigns a data item distinguished by some "key" into one of a number of possible locations in a lookup table, also called a hash table. For example, a hash function might take a string of letters and put it in one of twenty-six locations depending on its first letter. In this embodiment, the hash function takes the "key," here the value of the tag (e.g., <contact><name>), and calculates a location within the table from the value of the tag. Stored at the location in the lookup table are destinations registered to receive data associated with the tag. Destinations associated with a tag can therefore be immediately determined by applying the hash function to the value of the tag. In effect, the tag itself tells the invention how the data in the data stream should be split and where the data sub-streams should go.

The invention also supports sending data sub-streams to more than one destination. For general operations a list is kept of multiple pre-registered tags at a given hash location. When the hash value for a tag in the data stream points to a particular location, each pre-registered tag in the list is tested to see if it is an actual match or a miss. When a tag in the data stream matches more than one pre-registered tag in the list a data sub-stream is sent to the destinations associated with each matching tag.

Figure 5:
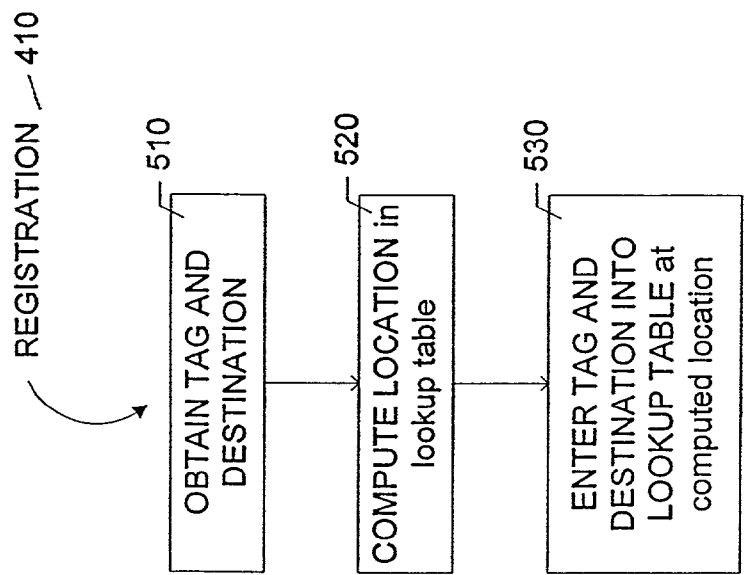
FIG. 5 is a flow diagram representing the logical steps of registering a destination for data associated with a tag.

FIG. 5 shows a flowchart of the REGISTRATION step 410. In step 510, the tag and destination are obtained. The tag and destination may be provided by a system administrator, by a message from a service support manager that is manually or electronically entered in the lookup table, or in any other way that allows entry of the tag and a corresponding destination to the lookup table. In step 520, a location in the lookup table is computed. In this embodiment, the individual hash values for each tag (i.e., each level of the hierarchy of a compound tag) are shifted and a logical OR function performed to calculate a single integer value from the tags comprising the compound tag. The integer value is then used as the index into the lookup table. In other words, if H1 is the hash value for <one>, H2 is the hash value for <two>, H3 is the hash value for <three>, and N is a number of bits per hash value, then the index value is calculated as follows:

$$(H1*2^N*2^N)+(H2*2^N)+H3$$

If tags <one>, <two> and <three> have respective hash values 1, 2 and 3, and N=6, then the calculated index has a value of 4,227. Those of skill in the art will recognize that the invention is not limited to this particular formula, but rather that any suitable formula for populating the lookup table may be used.

In step 530, the destination and tag are stored in the lookup table at the location indicated by the calculated index value. For example, destinations for compound tag <one><two><three> are stored in the lookup table at location 4,227.

In this embodiment of the invention, a compound tag may have fewer than the maximum levels of hierarchy (e.g. <one>). In calculating the index value, the hash value for each unused level of the hierarchy is zero. For tag <one>, the calculated index value will be 1 (one). As further illustrated below, any number of tags may be used to identify sub-streams. However, the greater the number of tags, the more processing time will be necessary to identify the sub-streams.

In FIG. 4, once the lookup table is built in step 410, control proceeds to step 415. At DATA STREAM ARRIVAL decision point 415, the system waits for a data stream to arrive by continually testing for the arrival of a data stream. When a data stream arrives, control passes to INITIALIZE step 417. Throughout the processing of the data stream, a running index pointing to a particular location in the lookup table is maintained. In INITIALIZE step 417, the running index is set to a value of zero for the data stream.

Control then passes to END OF DATA STREAM decision point 419. If there is no data remaining in the data stream, the process ends. If data remains in the data stream, control proceeds to SCAN DATA step 420, where the data stream is scanned for a start tag or an end tag. If a start tag is identified in START TAG step 425, control passes to PROCESS START TAG step 430. PROCESS START TAG step 430 updates the value of the running index.

Figure 6:
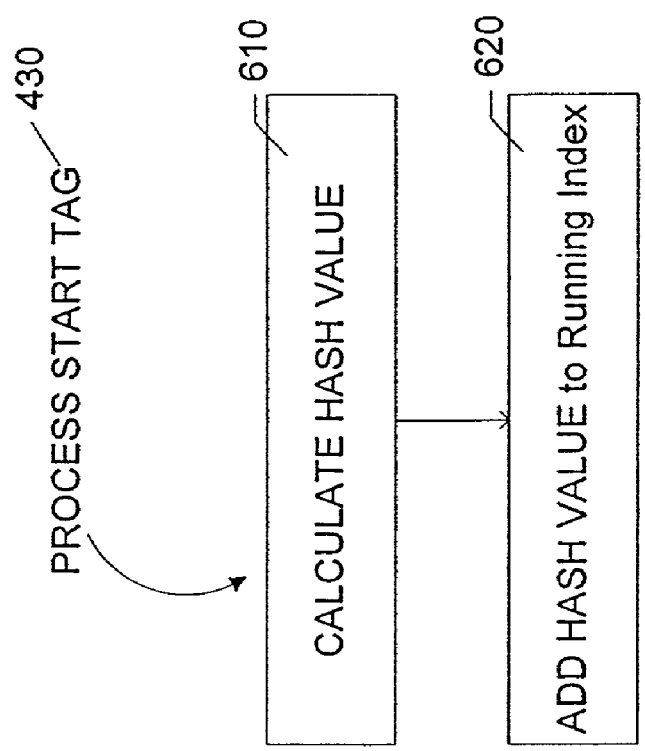
FIG. 6 is a flow diagram representing the logical steps of processing a start tag.

FIG. 6 shows the details of PROCESS START TAG step 430. In step 610, a hash value is calculated for the start tag. In step 620, the hash value is added to the value of the running index. At this point, the running index value points to a location in the lookup table for all destinations pre-registered for the start tag.

Returning to FIG. 4, if no start tag is identified in START TAG decision point 425 or when PROCESS START TAG step 430 is complete, control proceeds to END TAG decision point 440. If no end tag is detected in END TAG decision point 440, control returns to END OF DATA STREAM decision point 419. If an end tag is detected in END TAG decision point 440, control proceeds to PROCESS END TAG step 450.

Figure 7:
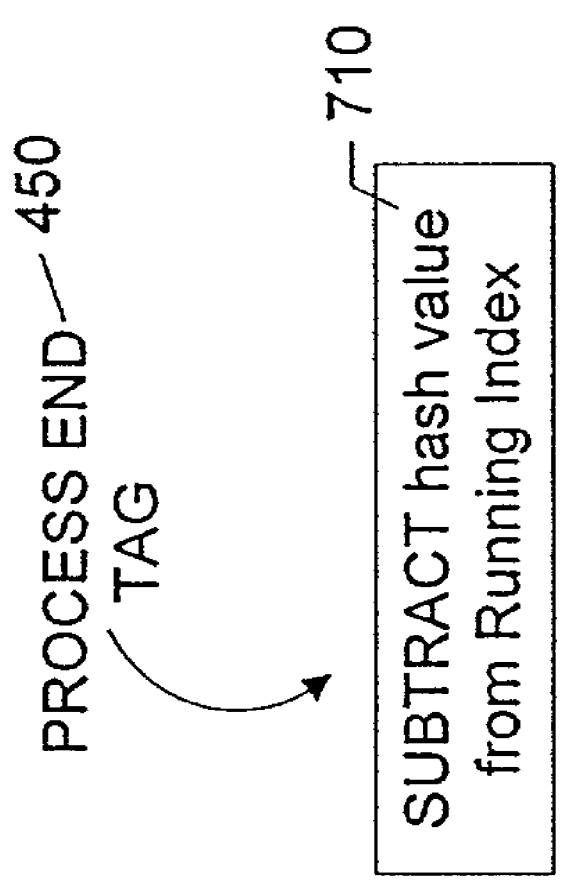
FIG. 7 is a flow diagram representing the logical steps of processing an end tag.

FIG. 7 shows the detailed processing for PROCESS END TAG step 450. In SUBTRACT step 710, the current hash value is subtracted from the value of the running index. The current hash value corresponds to the value of the most recent start tag processed. Subtracting the current hash value from the running index "moves" the running index in the lookup table to the next higher level in the hierarchy. For example, if the current compound tag being processed is <one><two><three>, when the end tag <\three> is processed, the next end tag to be searched for is the <\two> end tag. The hash value of <three> is subtracted from the running index. The running index then points to the position in the table where destinations for the compound tag <one><two> are located (if any such destinations exist).

Returning to FIG. 4, after completing PROCESS END TAG step 450, control proceeds to LOOK UP step 455. As illustrated further below (see Tables 1 and 2) the method scans the most specific tags before the more general tags. Using the running index, the lookup table entry is accessed. The running index is masked for each possible compound tag size (e.g, 3-, 2- and 1-level). For example, if the compound tag includes only two of a possible 3-level hierarchy, then the upper bits are masked and the value for H1 is zero.

From PROCESS END TAG step 450, control proceeds to MATCH decision point 460. In MATCH decision point 460, the lookup table entry at the location calculated from the value of the tag is examined. If the lookup table entry location contains a destination, then the data associated with the tag is determined in DETERMINE DATA step 462. The data associated with the tag is sent in SEND DATA step 465 to the registered destination. If no match is found in MATCH decision point 460, control returns to step 419, where the data stream is tested to see if the end of the data stream has been reached.

The following XML code excerpt and tables illustrate the operation of the invention with an XML data stream. In this example, the invention searches for tags <contact><Name> (of which there are two in the example), <system><os> (of which there is one), and <Name> only (of which there are three) as shown in the data stream.

```
<?XML VERSION="1.0" RMD="NONE"?>
<SUBFRAME>
    <subFrameID>13</subFrameID>
    <global>
        <contact>
            <Name>John</Name>
            <officePhone>2337</officePhone>
        </contact>
    </global>
```

-continued

```
<system>
    <Name>grizzly</Name>
    <os>Windows NT</os>
    <buildNo>1381</buildNo>
    <contact>
        <Name>Bill</Name>
        <officePhone>2316</officePhone>
    </contact>
</system>
</SUBFRAME>
```

Each compound tag (e.g. <contact><Name>) for which data are to be sent to a particular destination is pre-registered and inserted into the lookup table along with corresponding destinations for the data. The set of tags, or compound tags, constitutes the rules for the data to be split for any data stream. Any number of data streams may be processed and split using the same set of rules. An example of a lookup table is given in Table 1 below.

TABLE 1

LOOKUP TABLE

| Location/Index | Tag | Destination |
|---|---|---|
| 1 | | |
| 2 | | |
| ... | | |
| Hash-1 | <contact><Name> | Entitlement Checker |
| ... | | |
| Hash-2 | <Name> | Statistics Gathering |
| ... | | |
| Hash-3 | <system><os> | Routing System |
| ... | | |
| N | | |

As shown in FIGS. 2A and 2B, data can be routed to a service provider or other appropriate destination such as an entitlement checker, statistics gathering module or a routing system.

As the example data stream is processed, a running index location in the lookup table is calculated as shown in Table 2 below. Table 2 illustrates the running list of the tag hierarchy. With each additional registered tag level encountered, there is a test (lookup in the hash table) of the deepest tags (e.g. the two rightmost). If there is a hit then that sub-tag (e.g. <contact><Name>John) is sent to the sub-stream. As shown in Table 2 below, there can be multiple matches at any level.

TABLE 2

| Running tag list | Deepest 2 Match | Deepest 1 Match |
|---|---|---|
| <SUBFRAME> | | |
| <SUBFRAME><subFrameID>13 | | |
| <SUBFRAME><global> | | |
| <SUBFRAME><global><contact> | | |
| <SUBFRAME><global><contact><Name>John | Hash-1 | Hash-2 |
| <SUBFRAME><global><contact><officePhone>2337 | | |
| <SUBFRAME><system> | | |
| <SUBFRAME><system><Name>grizzly | | Hash-2 |
| <SUBFRAME><system><os>Windows NT | Hash-3 | |
| <SUBFRAME><system><buildNo>1381 | | |
| <SUBFRAME><system><contact> | | |
| <SUBFRAME><system><contact><Name>Bill | Hash-1 | Hash-2 |
| <SUBFRAME><system><officePhone>2316 | | |

As the invention processes the example data stream, when a tag is encountered, a location is computed and the entry in the lookup table at that location is examined for a match. If there is a match and a destination is registered, the data associated with the tag is "split" and sent to the corresponding destination. For example, the data associated with the <contact><Name> tag, "John", is sent to the destinations stored in the lookup table at locations Hash-1 and Hash-2.

The method disclosed is not restricted to a specific software, software language or software architecture. Each of the steps of the method disclosed may be performed by a module (e.g., a software module) or a portion of a module executing on a computer system. Thus, the above component organization may be executed on a desk top computer system, such as support desk top 230 (as previously shown in FIG. 2) or host server 120 (as previously shown in FIG. 2). The method may be embodied in a machine-readable and/or computer-readable medium for configuring a computer system to execute the method. Thus, the software modules may be stored within and/or transmitted to a computer system memory to configure the computer system to perform the functions of the module.

The operations described above and modules therefor may be executed on a computer system configured to execute the operations of the method and/or may be executed from computer-readable media. The method may be embodied in a machine-readable and/or computer-readable medium for configuring a computer system to execute the method.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims.

What is claimed is:

1. A method, comprising:
   pre-registering tags and corresponding destinations to receive data associated with the pre-registered tags, wherein each destination is a computer system used by a service provider;
   receiving a data stream from a plurality of users, wherein the data stream comprises a plurality of service requests from the plurality of users, wherein the data stream is processed as the data stream is being received, without the need to store the data stream;
   scanning the data stream of service requests for a tag;
   splitting the received data stream into sub-streams according to the pre-registered tags, each of the sub-streams comprising the associated data with each of the pre-registered tags;
   sending each of the sub-streams with the associated data immediately to the pre-registered destination corresponding to the pre-registered tag of the sub-stream without further processing each of the sub-streams, wherein the splitting and sending occur continuously while the data stream is being received; and
   communicating, by the service provider receiving the sub-stream, with each user to endeavor to solve a problem identified in each of the plurality of service requests of the user.

2. The method as recited in claim 1, wherein the data stream is an XML data stream.

3. A computer program product encoded in one or more non-transitory computer readable media, the computer product comprising:
   a set of instructions, executable on one or more computer systems, configured to:

pre-register tags and corresponding destinations to receive data associated with the pre-registered tags, wherein each destination is a computer system used by a service provider;

receive a data stream from a plurality of users, wherein the data stream comprises a plurality of service requests from the plurality of users, and wherein the data stream is processed as the data stream is received, without the need to store the data stream;

scan the data stream of service requests for a tag;

split the received data stream into sub-streams according to the pre-registered tags, each of the sub-streams comprising the associated data with each of the pre-registered tags;

send each of the sub-streams with the associated data immediately to the pre-registered destination corresponding to the pre-registered tag of the sub-stream without further processing of each of the sub-streams, wherein the splitting and sending occur continuously while the data stream is being received; and instruct the service provider receiving the sub-stream, to communicate with each user to endeavor to solve a problem identified in each of the plurality of service requests of the user.

4. The computer program product as recited in claim 3, wherein the data stream is an XML data stream.

\* \* \* \* \*